(12) United States Patent
De Amorim Novais Da Costa Nóbrega et al.

(10) Patent No.: US 9,409,336 B2
(45) Date of Patent: *Aug. 9, 2016

(54) METHOD FOR PREPARING COATED BINDER UNITS AND DEVICE FOR USE THEREIN

(75) Inventors: João Miguel De Amorim Novais Da Costa Nóbrega, Braga (PT); Eurico Filipe Dias Pessoa, Braga (PT); José António Colaço Gomes Covas, Braga (PT)

(73) Assignee: Shell Oil Company, Houston, TX (US)

( * ) Notice: Subject to any disclaimer, the term of this patent is extended or adjusted under 35 U.S.C. 154(b) by 925 days.

This patent is subject to a terminal disclaimer.

(21) Appl. No.: 13/513,440

(22) PCT Filed: Dec. 2, 2010

(86) PCT No.: PCT/EP2010/068772
§ 371 (c)(1),
(2), (4) Date: Oct. 16, 2012

(87) PCT Pub. No.: WO2011/067354
PCT Pub. Date: Jun. 9, 2011

(65) Prior Publication Data
US 2013/0032968 A1 Feb. 7, 2013

(51) Int. Cl.
*B29C 47/06* (2006.01)
*B29C 47/00* (2006.01)
(Continued)

(52) U.S. Cl.
CPC .............. *B29C 47/0004* (2013.01); *B01J 2/006* (2013.01); *B01J 2/20* (2013.01); *B29C 47/0007* (2013.01);
(Continued)

(58) Field of Classification Search
CPC  B29B 11/10; B29C 47/0009; B29C 47/0011; B29C 47/0016; B29C 47/0019; B29C 47/065

USPC .......... 264/141, 142, 143, 148, 171.1, 171.11
See application file for complete search history.

(56) References Cited

U.S. PATENT DOCUMENTS

| 3,026,568 A | 3/1962 | Moar ............................. 18/47.2 |
| 3,640,659 A | 2/1972 | Dimitroff ....................... 425/133 |

(Continued)

FOREIGN PATENT DOCUMENTS

| CN | 1253524 | 5/2000 |
| CN | 101010181 | 8/2007 |

(Continued)

OTHER PUBLICATIONS

Iwasaki, T. et al; "Rod-Form Asphalt Composition—Prepared By Extrusion Moulding Asphalt And Applying Thermoplastic Resin Before Cooling"; WPI/Thomson . . . ; vol. 1985, No. 45; Sep. 26, 1985.

*Primary Examiner* — Robert J Grun
(74) *Attorney, Agent, or Firm* — Charles W. Stewart

(57) ABSTRACT

A method for preparing coated binder units wherein the coated binder units comprise a core of binder coated with a layer of coating material, wherein the binder is a bituminous binder or a synthetic binder comprising a resin, an oil and optionally a polymer, which method comprises the steps of: (a) supplying the binder and the coating material to an co-extrusion device which comprises an even number of pairs of inner and outer dies, whereby the binder is supplied to the inner dies and the coating material is supplied to the outer dies; (b) co-extruding the binder and the coating material by means of the co-extrusion device, thereby producing streams of extrudate in which the binder is coated with a layer of the coating material; and (c) optionally, shaping the streams of extrudate, into units of the coated binder. The invention further relates to the co-extrusion device.

11 Claims, 3 Drawing Sheets

(51) Int. Cl.
    *B01J 2/00*     (2006.01)
    *B01J 2/20*     (2006.01)
    *B29C 47/02*     (2006.01)
    *B29C 47/08*     (2006.01)
    *B29C 47/12*     (2006.01)
    *B29C 47/26*     (2006.01)
    *B29C 47/30*     (2006.01)
    *B29C 47/70*     (2006.01)
    *C08L 95/00*     (2006.01)
    *B29B 11/10*     (2006.01)
    *B29C 47/22*     (2006.01)
    *B29C 47/28*     (2006.01)
    *B29K 95/00*     (2006.01)
    *B29K 105/00*     (2006.01)
    *B29L 7/00*     (2006.01)
    *B29L 31/06*     (2006.01)

(52) U.S. Cl.
CPC ........... *B29C 47/0021* (2013.01); *B29C 47/025* (2013.01); *B29C 47/0816* (2013.01); *B29C 47/0828* (2013.01); *B29C 47/128* (2013.01); *B29C 47/26* (2013.01); *B29C 47/30* (2013.01); *B29C 47/70* (2013.01); *C08L 95/00* (2013.01); *B29B 11/10* (2013.01); *B29C 47/0011* (2013.01); *B29C 47/0016* (2013.01); *B29C 47/0019* (2013.01); *B29C 47/0023* (2013.01); *B29C 47/0026* (2013.01); *B29C 47/0066* (2013.01); *B29C 47/021* (2013.01); *B29C 47/062* (2013.01); *B29C 47/22* (2013.01); *B29C 47/225* (2013.01); *B29C 47/28* (2013.01); *B29C 2793/009* (2013.01); *B29K 2095/00* (2013.01); *B29K 2105/251* (2013.01); *B29K 2105/253* (2013.01); *B29L 2007/002* (2013.01); *B29L 2031/06* (2013.01); *C08L 2555/54* (2013.01); *C08L 2555/72* (2013.01); *C08L 2555/80* (2013.01)

(56) References Cited

U.S. PATENT DOCUMENTS

| | | | |
|---|---|---|---|
| 4,154,893 A | 5/1979 | Goldman | 428/375 |
| 4,915,856 A * | 4/1990 | Jamison | 508/103 |
| 5,254,385 A | 10/1993 | Hazlett | 428/76 |
| 5,641,445 A | 6/1997 | Fauble et al. | 264/171.24 |
| 5,732,364 A | 3/1998 | Kalb et al. | |
| 2005/0056952 A1 | 3/2005 | Walker | 264/1.29 |
| 2008/0015288 A1 | 1/2008 | Antoine et al. | 524/69 |

FOREIGN PATENT DOCUMENTS

| | | | |
|---|---|---|---|
| EP | 1361256 | 11/2003 | C08L 95/00 |
| EP | 1772250 | 4/2007 | B29C 47/56 |
| EP | 1782938 | 5/2007 | B29C 47/30 |
| EP | 1859934 | 11/2007 | B32B 27/30 |
| JP | 60189414 | 9/1985 | B29C 47/00 |
| WO | WO03004246 | 1/2003 | B29C 47/12 |
| WO | WO2008095967 | 8/2008 | B32B 7/06 |
| WO | WO2010090595 * | 8/2010 | C08L 95/00 |

* cited by examiner

METHOD FOR PREPARING COATED BINDER UNITS AND DEVICE FOR USE THEREIN

PRIORITY CLAIM

The present application claims priority from PCT/EP2010/068772, filed 2 Dec. 2010, which claims priority from EP 09306187.7, filed 4 Dec. 2009.

FIELD OF THE INVENTION

The invention relates to a method for preparing coated binder units, and a device for use in said method.

BACKGROUND OF THE INVENTION

Bitumen is a viscous liquid consisting essentially of hydrocarbons and their derivatives. It is soluble in trichloroethylene and softens gradually when heated. Bitumen is used as a binder in a variety of applications. Bitumen may be combined with aggregate to provide asphalt that can be used in the manufacture of roads. Alternatively, bitumen may be used in industrial applications such as roofing, flooring or sealing.

In recent years synthetic binders have also been used. Synthetic binders, such as Shell's Mexphalte C® possess similar rheological and mechanical properties to the bituminous binders typically used in road applications. The synthetic binders are typically clear, so they are readily pigmented and are used to obtain coloured asphalt mixture.

In this description, the term "binder" covers both bituminous materials and synthetic materials having similar rheological and mechanical properties. The term "asphalt" in the present description is used to describe a mixture of binder and aggregate.

Bituminous and synthetic binders are typically transported in the heated state to ensure that they are sufficiently fluid for use. However, this is costly in terms of energy usage and requires strict safety procedures. Also, if the binder is stored at elevated temperature for an extended period this can lead to changes in the properties of the binder, so storage time is typically limited to avoid degradation in binder properties.

It is desirable to transport and store the binder at ambient temperature, preferably as units of a size and shape that are readily handled. The term "unit" as used in the present description encompasses a wide variety of discrete solid entities such as pellets, rods, sheets, slabs etc. However, the binders tend to be extremely sticky so that the units creep and agglomerate, particularly when stored at ambient temperature for extended periods. Efforts have been made to produce binder units that are not subject to agglomeration.

U.S. Pat. No. 3,026,568 describes a process wherein coated bitumen pellets are prepared by spraying molten bitumen into a stream of air carrying a powdered material such as powdered limestone. The purpose of the coating is to prevent the pellets from adhering to one another. It has proved difficult to practise this method on an industrial scale.

U.S. Pat. No. 5,254,385 describes encapsulated asphalt (bitumen) articles wherein bitumen is contained inside a polymer cover. A polymeric material is heat sealed to form a three side container or pouch, molten bitumen is poured into the pouch, and the remaining opening of the container is closed by heat sealing. The encapsulation prevents separate bitumen elements from agglomerating, adhering or coalescing to form larger masses of bitumen. The encapsulation process is likely to be slow, and is probably too costly to be applied on a large scale.

EP 1 361 256 describes a method for preparing granules wherein an oil is mixed with polyethylene, a bituminous material is added, and the resulting mixture is subjected to mixing extrusion. The resulting granules can be described as a mixture of a polyethylene phase and a bituminous phase in which the polyethylene phase is a semi-continuous phase and the bitumen phase is a discontinuous phase. A high proportion of polymer in the granules is needed to prevent deformation of the granules, and this may detrimentally alter the properties of the bitumen and/or may increase the cost of the granules such that they are unlikely to be economical.

US 2008/0015288 describes an extrusion process for preparing master batch granules comprising bitumen and polymer. To prevent the granules from sticking, an anti-sticking agent may be included in the granules, e.g. by adding the anti-sticking agent directly to the extruder, or the anti-sticking agent may be applied to the surface of the extrudate as it cools on leaving the extruder. Again, a high proportion of polymer in the granules is needed to prevent deformation of the granules, and this may detrimentally alter the properties of the bitumen and/or may increase the cost of the granules such that they are unlikely to be economical.

The present inventors have sought to provide an alternative method of preparing binder units that can be transported at ambient temperatures and are not subject to creep and agglomeration.

SUMMARY OF THE INVENTION

Accordingly, the present invention provides a method for preparing coated binder units wherein the coated binder units comprise a core of binder coated with a layer of coating material, wherein the binder is a bituminous binder or a synthetic binder comprising a resin, an oil and optionally a polymer, which method comprises the steps of:
(a) supplying the binder and the coating material to an co-extrusion device which comprises an even number of pairs of inner and outer dies, whereby the binder is supplied to the inner dies and the coating material is supplied to the outer dies;
(b) co-extruding the binder and the coating material by means of the co-extrusion device, thereby producing streams of extrudate in which the binder is coated with a layer of the coating material; and
(c) optionally, shaping the streams of extrudate, into coated binder units.

The inventors have developed a co-extrusion process that can be used to prepare coated binder units that are not subject to agglomeration and that can be transported and stored for extended periods at ambient temperature.

DETAILED DESCRIPTION OF THE INVENTION

Figure 1:
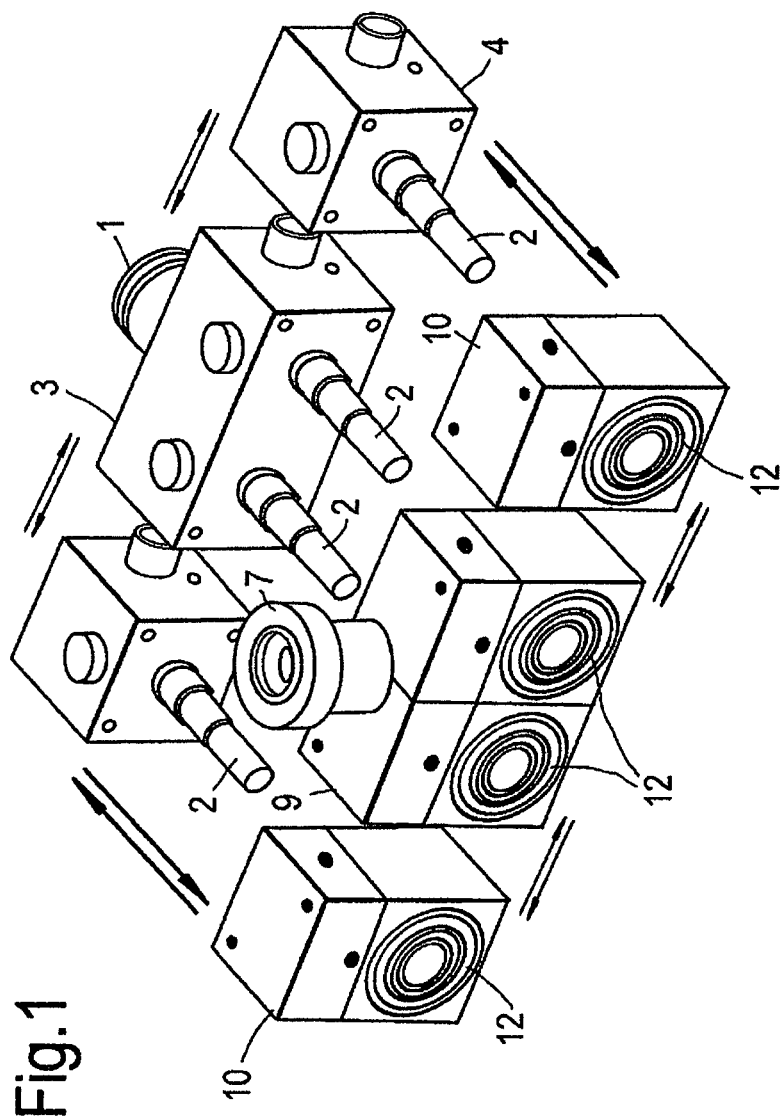
FIG. 1 shows parts of a co-extrusion device that can be used in the method of the invention.

In the method of the present invention use is made of a co-extrusion device which comprises an even number of pairs of inner and outer dies. The use of an even number of pairs of inner and outer dies, together with flow adjusting valves, ensures that a balanced flow of binder and coating material inside the various co-extrusion units is obtained. In addition, the use of such a number of pairs of inner and outer dies will considerably expand the capacity of the co-extrusion system.

Suitably, the even number of pairs of inner and outer pairs is in the range of from 2-40, preferably in the range of from 4-16, and more preferably in the range of from 4-10.

The coated binder units comprise a core of binder coated with a layer of coating material. In one embodiment of the invention, the units are pellets, having a central core of binder and an outer layer of coating material. In a second embodiment, the units are rods having a central core of binder through part or all of the length of the rod and an outer layer of coating material. In a third embodiment of the invention, the units are slabs wherein a central layer of binder is located between outer layers of coating material. The exact shape of the coated binder units can vary, but desirably the coated binder units are of a shape and size such that they are readily handled and transported. Pellets have the advantages usually associated with the storage, flow, and handling of granular materials.

The binder is a bituminous binder or is a synthetic binder having similar rheological and mechanical properties to a bituminous binder. The penetration at 25° C. of the binder (as measured according to EN 1426) is preferably between 0 and 350 dmm, more preferably between 10 and 250 dmm. The softening point of the binder (as measured according to EN 1427) is preferably between 30 and 140° C., more preferably between 35 and 95° C.

Preferably the binder is a bituminous binder. Suitable bituminous binders include residues from the distillation of crude oil, cracked residues, naturally occurring bitumens or blends of various bitumen types. Examples of bituminous binders that may be conveniently used in the present invention include distillation or "straight run" bitumen, precipitation bitumen, e.g. propane bitumen, oxidised or blown bitumen, naphthenic bitumen or mixtures thereof. The bituminous binder may be prepared by blending a bitumen with a flux oil, e.g. an aromatic, napthenic or paraffinic flux oil, or a vegetable oil. The bituminous binder may also comprise a polymer such that the binder is a polymer-modified bitumen. Suitable polymers include thermoplastic elastomers and/or plastomers, e.g. styrenic block copolymers and/or olefinic copolymers such as ethylene vinyl acetate. The polymer can be from petroleum or renewable origin, or rubber recovered from, for example, recycled tyres. The binder preferably contains up to 40 wt % modifers such as polymers, based upon the weight of the binder, most preferably up to 15% modifiers. The bituminous binder may also comprise additives, such as waxes, polyphosphoric acid, penetration hardeners.

In an alternative embodiment, the binder is a synthetic binder. The synthetic binder comprises a resin, an oil and optionally a polymer. The resin may be a resin of vegetable origin such as a rosin ester. Alternatively, the resin may be a petroleum resin or a coumarone-indene resin. The resin may have been modified such that it contains carboxylic acid, carboxylic acid anhydride or hydroxyl groups, as described in EP 179 510. The oil may be a vegetable oil or a mineral lubricating oil extract, e.g. a Bright-Stock extract.

The binder may comprise a filler material. The filler material may be any mineral material wherein the particle size is smaller than 75 µm. The binder may comprise up to 20 wt % filler, based upon the weight of the binder.

The binder may comprise sulphur, in amount of from 0.01 to 80 wt %, based upon the weight of the binder, more preferably from 0.01 to 50 wt %.

The coating material is a material that inhibits agglomeration of the coated binder units when the units are stored at ambient conditions. The coating material may improve the aesthetic aspects of the coated binder units (e.g. may be coloured), may provide information (e.g. may be printed with text or an image) and/or may improve the binding functions of the binder.

The coating material is preferably a polymer, bitumen having a penetration at 25° C. of less than 5 dmm, sulphur, blends of these materials with filler materials, blends of these materials with fibre materials, and blends of two or more of these materials. More preferably the coating material is a polymer or a blend comprising at least 50 wt % polymer. The polymer may be of renewable origin and/or may be biodegradable. The polymer may be a recycled polymer. In one embodiment, the coating material is a polyolefin such as polyethylene or polystyrene, or is a blend comprising at least 50 wt % polyolefin. Preferably, the coating material is polyethylene or a blend comprising at least 50 wt % polyethylene. In another embodiment, the coating material is a thermoplastic elastomer or plastomer, or a blend comprising at least 50 wt % of a thermoplastic elastomer or plastomer. In this embodiment the polymer is used both as a coating material (to inhibit agglomeration of the units) and as a component of the binder formulation, improving the properties of the product that will be made from the binder. The thermoplastic elastomer or plastomer may be a styrenic block copolymer, olefinic copolymer such as ethylene vinyl acetate, polyurethane or polyether-polyester copolymer.

The coating material may contain additives that enhance the properties of asphalt that is produced from the coated binder units.

The melting point of the coating material is preferably lower than 200° C. to prevent emissions from the binder, more preferably below 180° C., most preferably below 160° C. to provide easy subsequent melting.

The layer of coating material in the coated binder units of the invention is preferably substantially continuous, such that at least 90% of the surface area of the core of binder is coated with the coating material, more preferably at least 95%, most preferably at least 99%.

The weight ratio of binder to coating material is preferably at least 5:1, more preferably at least 10:1, most preferably at least 30:1. It is desirable to minimise the quantity of coating material if the coating material is a more expensive component than the binder material. If the coating material is a polymer, the polymer may be chosen such that it has positive effects on the resulting binder product and the amount of coating material may be a balance between improved properties and cost. Where the coating material is a thermoplastic elastomer or plastomer, a suitable weight ratio of binder to coating material is between about 99:1 and 9:1.

The average thickness of the layer of coating material is preferably at least 10 µm. The layer needs to be sufficiently thick such that a substantially continuous coating is achieved. The average thickness of the layer of coating material is suitably in the range of from 0.01 mm to 5 mm, and preferably in the range of from 0.1 m to 1 mm. Preferably the average thickness of the layer of coating material is less than 3 mm, more preferably less than 1 mm and most preferably less than 0.4 mm. A layer thicker than 3 mm is not preferred if it is desirable to minimise the quantity of coating material.

The coated binder unit may comprise further additives, e.g. softening agents and lubricants, such as wax or penetration index boosters such as waxes, polyphosphoric acid and ethylene polymers. However, in a preferred embodiment the coated binder unit consists essentially of the binder and the coating material.

In the embodiment where the units are pellets, the size of the pellets is preferably such that the average longest dimension of the pellets is preferably less than 200 mm, more preferably less than 100 mm, yet more preferably less than 80 mm. The variability in the pellet size is likely to be small because of the use of extrusion in the method of the invention.

The pellets are preferably substantially cylindrical or of flat rectangular shape because their transportation is relatively easy (these shapes have good packing density). However, the pellets may also be spherical, spheroid, or may have irregular shapes.

In the embodiment where the units are rods, the size of the rods is preferably such that the average longest dimension of the rods is more than 15 mm, more preferably more than 100 mm and more preferably more than 1 m. The term "rod" is simply used to describe a shape wherein the length is significantly greater than the diameter, e.g. an aspect ratio of at least 2, more preferably at least 10, most preferably at least 20. The rod is not necessarily straight but can be curved or coiled. The cross-section of the rod may be a variety of shapes, e.g. spherical, oval, cuboid. The average hydraulic diameter of the rods is suitably less than 200 mm, preferably less than 100 mm, more preferably less than 80 mm, yet more preferably less than 50 mm. The variability in the rod diameter is likely to be small because of the use of extrusion in the method of the invention.

In the embodiment where the units are sheets, the size of the sheets is preferably such that the average longest dimension is more than 15 mm, more preferably more than 100 mm. The term "sheet" is simply used to describe a substantially flat shape wherein two of the dimensions (length and width) are significantly greater than the thickness. The average width of the sheets is preferably from 10 mm to 1 m. The average thickness of the sheets is preferably less than 15 mm. The variability in the sheet width and thickness is likely to be small because of the use of extrusion in the method of the invention.

The extrudates obtained in accordance with the present invention suitably have a non-circular profile, whereby the average hydraulic diameter is less than 150 mm.

The method comprises a step of co-extruding the binder and the coating material, thereby producing an extrudate of binder coated with a layer of coating material. Extrusion is a process wherein a material is pushed through a die of the desired shape. In co-extrusion, two or more materials are extruded simultaneously. In the present process, the binder and the coating material are extruded simultaneously such that the binder is coated with a layer of coating material. Preferably, the binder and the coating material are extruded simultaneously such that the resulting extrudate has a central core of binder and a layer of coating material substantially coating the binder, preferably coating at least 90% of the surface area of the binder, more preferably coating at least 95% of the surface area of the binder, most preferably coating all of the surface area of the binder. However, in an alternative embodiment, the resulting extrudate has a layer of coating material covering only one face of the binder material and further shaping is required to produce units comprising a core of binder coated with a layer of coating material. The preferred thickness of the coating layer on the extrudate is the same as the preferred thickness of the coating layer on the coated binder units.

To prepare pellets or rods, the co-extrusion is preferably carried out using a co-extrusion device having inner and outer dies having preferably concentrically arranged extrusion orifices. The binder is supplied to the inner dies and the coating material is supplied to the outer dies.

It is likely that the binder and the coating material will have significantly different melting temperatures (when the coating material is a polymer, the melting temperature of the polymer is likely to be significantly higher than the melting temperature of the binder). Therefore, in a preferred embodiment of the invention, the heat transfer between each of the pair of inner and outer dies is controlled. This can be achieved by having an insulating gap between each pair of inner and outer dies. The insulating gap can be filled with an insulating material. However, in a preferred embodiment, a coolant material such as water is circulated in the insulating gap. U.S. Pat. No. 3,640,659 provides an example of a co-extrusion device wherein a temperature gradient may be maintained between inner and outer dies during a co-extrusion process.

The co-extrusion device preferably comprises one inlet for the binder and one inlet for the coating material.

The binder is preferably conveyed towards the inner dies so that it reaches the inner dies at a temperature close to its softening paint.

With regards of step (a), the feed step, the binder can be fed to the co-extrusion device from a vertical hopper. Preferably the hopper is heated and kept at temperatures above room temperature such that the binder is above its softening point and can flow. The binder can be conveyed towards the inner dies using a single screw or a twin screw extruder, a pump (e.g. a gear pump) and appropriate piping or any other device that generates pressure at the die entry.

Prior to its introduction into the inner dies, the system used in step (a), can require the temperature of the binder to be higher than its softening point value so that the binder is fluid enough to flow easily, e.g. at a temperature roughly 50° C. higher than its softening point, but not exceeding 100° C. above its softening point to avoid damaging the product. In one embodiment, the feeding system in step (a) is a pump which can convey the binder at a temperature close to its softening point value (preferably less than 40° C. above the softening point, more preferably less than 20° C. above the softening point).

If the binder is to consist of a blend of components e.g. a binder comprising a filler or a polymer, the blending can be accomplished in an extruder or a pump connecting a hopper to the inner dies.

The binder exits the dies at a temperature close to its softening point value (preferably less than 100° C. above the softening point, more preferably less than 50° C. above the softening point) so that it is still able to flow and, at the same time, present enough consistency for the extrudate to sustain its own shape. Under such thermal conditions, spillage of hot binder is also avoided.

The coating material is preferably conveyed towards the outer dies using a screw or a ram extruder. The temperature and flow rate of the coating material is adapted depending on the nature of the coating material.

The flow rates of the binder and the coating material are determined taking into account the equipment capability so that the flow of the material is stable and the extrudate is regular in shape. Typical residence times within the co-extrusion device are preferably lower than 5 minutes, more preferably lower than 1 minute.

The extrusion in step (b) may be continuous (producing indefinitely long material) or semi-continuous (producing many short pieces). In one embodiment of the invention, the extrusion may be carried out such that sections of the extrudate are composed only of coating material, e.g. there are sections composed of a core of binder coated with a layer of coating material and there are sections composed only of coating material.

The extrudate preferably has a central core of binder and a layer of coating material substantially coating the binder. In this instance, step (c) wherein the extrudate is further shaped may be desirable but is not necessary, and the extrudate produced in step (b) may be the coated binder unit of the invention. However, where the layer of coating material does not substantially coat the binder in the extrudate, further shaping in step (c) is necessary.

In one embodiment of the invention, in step (c) the shaping of the extrudate consists of division of the extrudate, preferably into pellets or rods.

The coated binder units are then suitably combined with aggregate to provide asphalt. The asphalt can be used to form asphalt pavement in conventional pavement-laying processes or alternatively can be used in joining processes such as forming joints between the gaps between paving stones or cobblestones.

The present invention also relates to a co-extrusion device which comprises an inlet for a first material and an inlet for a second material, an even number of pairs of inner and outer dies, and a number of outlets for streams of extrudate.

Preferably, the co-extrusion device comprises an even number of pairs of the inner and outer dies which is in the range of from 2-40.

Preferably, the inner and outer dies have concentrically arranged extrusion orifices.

Preferably, there is an insulating gap between each pair of inner and outer dies.

The present co-extrusion device preferably comprises one inlet for the binder and one inlet for the coating material.

Suitably, in respect of one or more pairs of inner and outer dies the size of the gap between the inner and outer die is adjustable, allowing the production of coatings with different dimensions and thicknesses.

Suitably, the dimensions of one or more outer dies are adjustable, allowing the thickness of the layer of coating material to be adjusted.

Suitably, the dimensions of one or more inner dies are adjustable, allowing the average diameter of the core binder to be adjusted.

Suitably, the dimensions of one or more inner dies and one or more outer dies are adjustable.

FIG. 1 shows how the various parts can be interconnected to provide a co-extrusion device that can be used in the present invention. The basic design produces two co-extruded rods, with the polymer being fed vertically via port (7) and the binder horizontally via port (1). The basic co-extrusion head comprises two parts (3 and 9), one ensuring a balanced polymer flow through the two outlets (12), and the other ensuring a balanced binder flow through the two outlets (2), which are positioned concentrically inside outlets (12).

Coupling two additional co-extrusion units involves fixing four parts, two (10 and 4) at each side the basic design. The operation can be repeated to increase the number of coextrusion units.

Figure 2A:
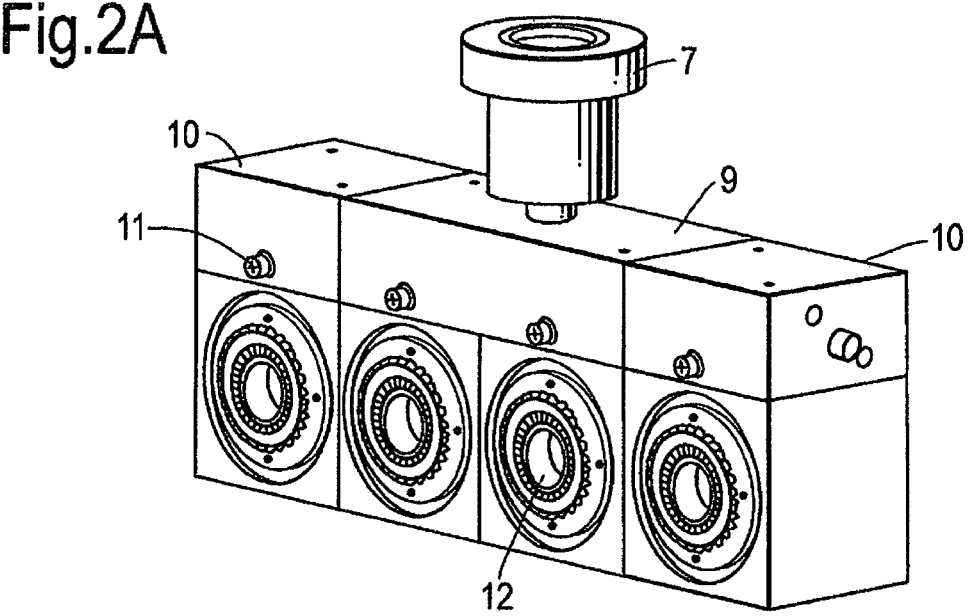
FIGS. 2A and 2B show the parts of a co-extrusion die that are used to distribute the polymer through the various co-extrusion units.
Figure 2B:
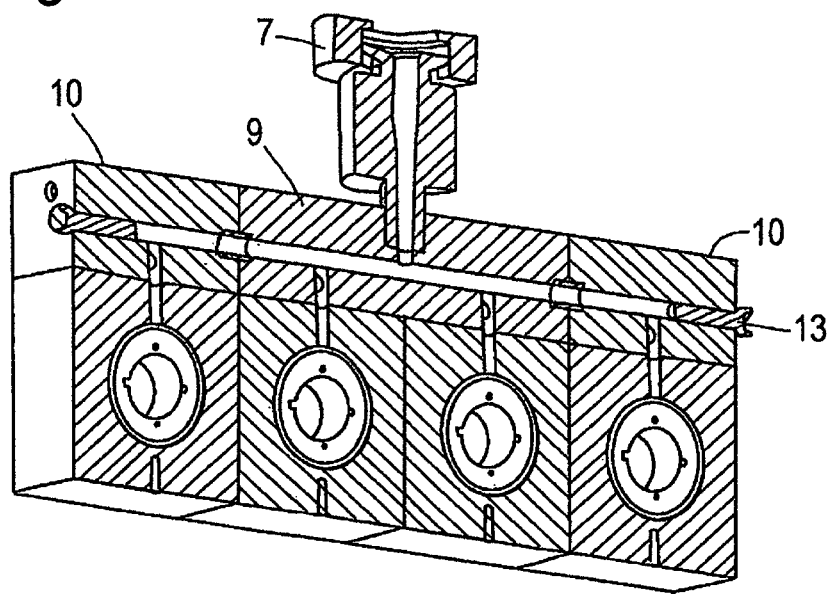

FIG. 2(a) shows the part dealing with the polymer flow for an extrusion head capable of producing four extrudates. FIG. 2(b) shows the flow channel of the polymer from the inlet (7) to outlet (12). Screws (11) work as flow valves, assisting flow balancing. Tap (13) blocks the flow channel that can be used for further expansion.

Figure 3A:
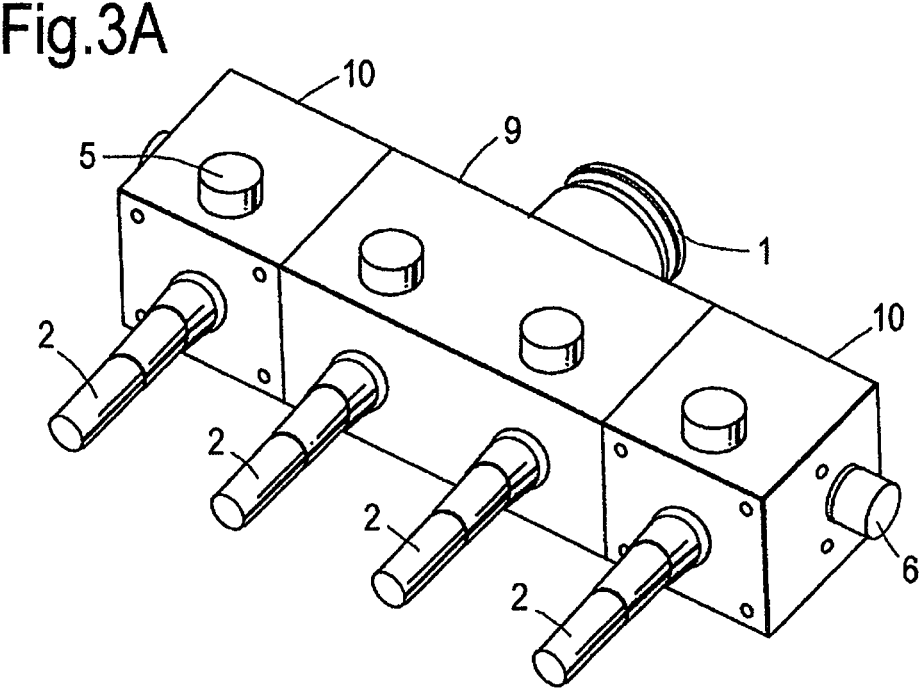
FIGS. 3A and 3B show the parts of a co-extrusion die that are used to distribute the binder through the various co-extrusion units.
Figure 3B:
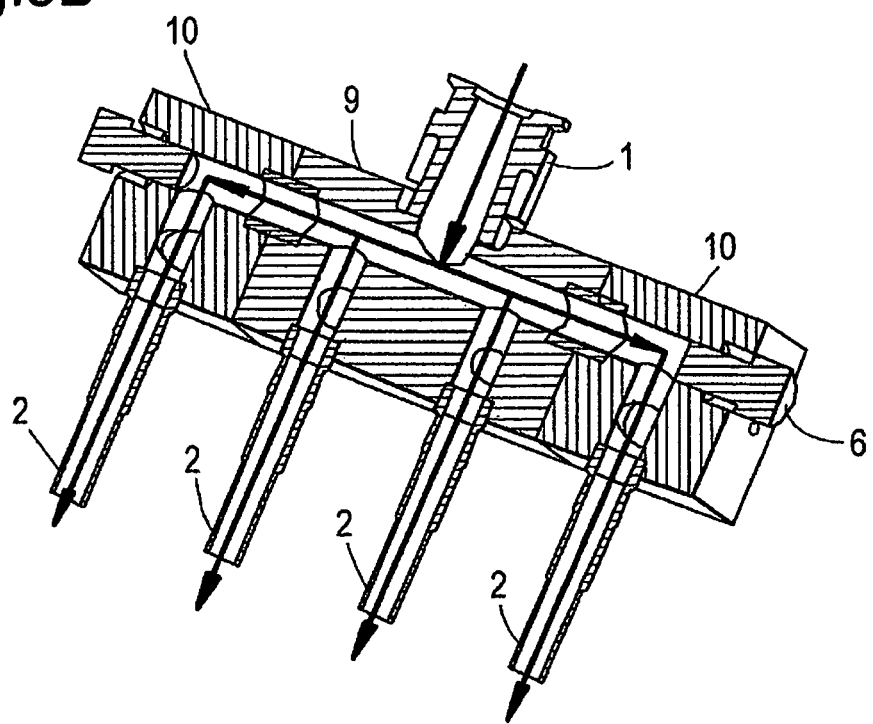

FIG. 3(a) shows the part dealing with the binder flow for an extrusion head capable of producing four extrudates. FIG. 3(b) shows the flow channel of the binder from the inlet (1) to outlet (2). Screws (5) work as flow valves, assisting flow balancing. Tap (6) blocks the flow channel that can be used for further expansion.

EXAMPLES

The invention will now be described by reference to examples which are not intended to be limiting of the invention.

Example 1

A 160/220 penetration grade bitumen was coated with low density polyethylene. Bitumen and polyethylene were fed to a co-extrusion device comprising two pairs of inner and outer dies; the bitumen was fed to the inner dies and the polyethylene was fed to the outer dies. The bitumen was processed at a temperature of about 50° C. and the polyethylene was processed at a temperature of 160 to 180° C. The resulting two streams of extrudate were rods of bitumen having a diameter of about 30 mm, coated with a polyethylene layer with a thickness of about 0.3 mm.

Example 2

A 160/220 penetration grade bitumen was coated with low density polyethylene. Bitumen and polyethylene were fed to a co-extrusion device comprising two pairs of inner and outer dies; the bitumen was fed to the inner dies and the polyethylene was fed to the outer dies. The bitumen exited the die at a temperature about 50° C. and the polyethylene was processed temperature of 160 to 180° C. The resulting two streams of extrudate were rods of bitumen having a diameter of about 25 mm, coated with a polyethylene layer with a thickness of about 0.3 mm.

Example 3

A 160/220 penetration grade bitumen was coated with low density polyethylene. Bitumen and polyethylene were fed to a co-extrusion device comprising two pairs of inner and outer dies; the bitumen was fed to the inner dies and the polyethylene was fed to the outer dies. The bitumen exited the die at a temperature about 50° C. and the polyethylene was processed temperature of 160 to 180° C. The resulting two streams of extrudate were rods of bitumen having a diameter of about 30 mm, coated with a polyethylene layer with a thickness of about 0.2 mm.

Example 4

A 160/220 penetration grade bitumen was coated with low density polyethylene containing 1% of erucamide, an external lubricant. Bitumen and polyethylene were fed to a co-extrusion device comprising two pairs of inner and outer dies; the bitumen was fed to the inner dies and the polyethylene was fed to the outer dies. The bitumen exited the die at a temperature about 50° C. and the polyethylene was processed temperature of 160 to 180° C. The resulting two streams of extrudate were rods of bitumen having a diameter of about 30 mm, coated with a polyethylene layer with a thickness of about 0.2 mm.

Example 5

A 160/220 penetration grade bitumen was coated with low density polyethylene containing 1% of oleamide, an external lubricant. Bitumen and polyethylene were fed to a co-extrusion device comprising two pairs of inner and outer dies; the bitumen was fed to the inner dies and the polyethylene was fed to the outer dies. The bitumen exited the die at a temperature about 50° C. and the polyethylene was processed temperature of 160 to 180° C. The resulting two streams of extrudate were rods of bitumen having a diameter of about 30 mm, coated with a polyethylene layer with a thickness of about 0.2 mm.

What is claimed is:

1. A method for preparing coated binder units, which method comprises the steps of:
   (a) supplying a binder material that is either bitumen or a synthetic binder having rheological and mechanical properties of bitumen, wherein the bitumen and the synthetic binder each have a characteristic softening point, and a coating material that is a polymer having a melting point of less than 200° C., to an co-extrusion device at a weight ratio of binder material-to-coating material of at least 5:1, wherein the co-extrusion device comprises an even number of pairs of inner dies and outer dies, whereby the binder material is supplied to the inner dies at a temperature above 50° C. above its characteristic softening point and not exceeding 100° C. above its characteristic softening point and the coating material is supplied to the outer dies at a temperature below its melting point;
   (b) co-extruding the binder material and the coating material by means of the co-extrusion device to thereby produce streams of extrudate comprising a core of the binder material coated with a layer of the coating material, wherein the layer is substantially continuous and has an average thickness of at least 10 μm; and
   (c) shaping the streams of extrudate into the coated binder units.

2. A method according to claim 1, wherein the even number of pairs of the inner and outer dies is in the range of from 2-40.

3. A method according to claim 1, wherein the inner and outer dies have concentrically arranged extrusion orifices.

4. A method according to claim 1, wherein there is an insulating gap between each pair of inner and outer dies, and a coolant material is circulated in the insulating gap.

5. A method according to claim 1, wherein the co-extrusion device comprises one inlet for the binder and one inlet for the coating material.

6. A method according to claim 1, wherein the co-extrusion device contains flow valves that ensure balanced flow at the various die exits.

7. A method according to claim 1, wherein the binder material is a synthetic binder, comprising a resin and an oil.

8. A method according claim 1, wherein the units are pellets, and the average longest dimension of the pellets is less than 100 mm.

9. A method according to claim 1, wherein the units are rods, the average hydraulic diameter of the rods is less than 200 mm.

10. A method according to claim 9, wherein the average diameter of the core of binder is in the range of from 10 to 100 mm and the average thickness of the layer of the coating material is in the range of from 0.05 to 5 mm.

11. A method according to claim 1, wherein the extrudates have a non-circular profile, having an average hydraulic diameter of less than 150 mm.

* * * * *